United States Patent [19]

Drumm

[11] Patent Number: 5,188,377
[45] Date of Patent: Feb. 23, 1993

[54] EXTERNALLY-MOUNTED, STATIONARY-DESIGN, SELF-ALIGNING ROTARY FACE SEAL

[75] Inventor: Kevin R. Drumm, Hamilton, Canada

[73] Assignee: Nuraseal Company, Limited, Ontario, Canada

[21] Appl. No.: 908,727

[22] Filed: Jul. 6, 1992

Related U.S. Application Data

[63] Continuation of Ser. No. 621,458, Dec. 4, 1990, abandoned.

[30] Foreign Application Priority Data

Dec. 5, 1989 [CA] Canada ................. 2004636

[51] Int. Cl.$^5$ .............................................. F16J 15/34
[52] U.S. Cl. ..................... 277/81 S; 277/81 R; 277/82
[58] Field of Search ............... 277/81 S, 81 R, 93 SD, 277/82, 83, 91

[56] References Cited

U.S. PATENT DOCUMENTS

| | | | |
|---|---|---|---|
| 2,247,505 | 7/1941 | Kohler | 277/81 |
| 2,460,746 | 2/1949 | Guthrie et al. | 277/91 |
| 2,828,983 | 4/1958 | Hunt | 277/81 S |
| 3,599,990 | 8/1971 | Greiner et al. | 277/81 S |
| 3,689,084 | 9/1972 | Smedley | 277/188 R |
| 3,749,412 | 7/1973 | Lingley | 277/81 R |
| 3,988,026 | 10/1976 | Kemp, Jr. | 277/65 |
| 4,296,935 | 10/1981 | Inouye | 277/81 R |
| 4,304,407 | 12/1981 | Asher | 277/91 |
| 4,413,831 | 11/1983 | Washida | 277/83 |
| 4,576,384 | 3/1986 | Azibert | 277/83 |
| 4,583,748 | 4/1986 | Weichenrieder, Sr. | 277/81 R |
| 4,586,719 | 5/1986 | Marsi et al. | 277/81 R |

Primary Examiner—William A. Cuchlinski, Jr.
Assistant Examiner—D. Depumpo
Attorney, Agent, or Firm—Millen, White, Zelano and Branigan

[57] ABSTRACT

An externally-mounted, stationary-design, self-aligning, rotary face-seal is provided for securement to a rotatable shaft member extending through a housing of equipment containing a media (e.g. liquid, gas or granular solids) which is to be sealed therein. The seal includes a diametrically-split mounting plate having a plurality of spaced-apart recesses in a face thereof, the assembled mounting plate being secured in sealed relation to the housing of the equipment and with the rotatable shaft member extending through the mounting plate and projecting into an ambient environment exteriorly of the housing. The seal includes a diametrically-split stator face disposed in the ambient environment. A face of the stator is fitted with spaced-apart anti-rotation guide pins, the projecting ends of the guide pins being disposed within the associated recesses in a face of the mounting plate. A resilient spring member is captured on each respective guide pin. One end of the spring member abuts a face of the stator. Each spring member is retained on the guide pin, thereby providing a pre-assembled unit comprised of the stator, the guide pins and the resilient spring members. The seal also includes a diametrically-split rotor which is fluid-tightly fitted and secured onto the rotatable shaft in the ambient environment, with its inboard face in sealing contact with the outboard face of the stator.

8 Claims, 3 Drawing Sheets

5,188,377

EXTERNALLY-MOUNTED, STATIONARY-DESIGN, SELF-ALIGNING ROTARY FACE SEAL

This application is a continuation of application Ser. No. 07/621,458, filed Dec. 4, 1990, now abandoned.

BACKGROUND OF THE INVENTION (i) Field of the Invention

This invention relates to an externally-mounted, stationary-design, self-aligning rotary face-seal for inhibiting any fluid or product flow through a space formed, for example, between a casing and a rotary shaft extending through the casing. More particularly, it relates to an externally-mounted, stationary-design, self-aligning rotary face-seal for inhibiting any fluid or product flow between two relatively rotating faces, e.g., the end faces of a rotary ring fitted to a rotary shaft and of a stationary ring fitted to the casing. In this invention, the face which is free to move axially, by means of forces applied by the resilient operator is the non-rotating face. In most mechanical face-seal designs, it is the rotary face which is directly acted upon by the force applied by the resilient operator.

(ii) Description of the Prior Art

Many shaft seals have been proposed which are basically constructed such that a rotary ring fitted onto a rotary shaft, in an axially-slidable manner is thrusted by means of a spring located behind the rotary ring until the end face of the latter comes into tight contact with the end face of a stationary ring fitted to a casing. In this way, fluid-tightness is ensured between the end faces of the rotating and stationary rings while sliding contact is maintained at the contact area therebetween. Since the spring is disposed so as to thrust the rotary ring in the axial direction, a large volume of axial space must be occupied by the spring.

U.S. Pat No. 4,413,831 patented Nov. 8, 1983 by A. Washida et al attempted to provide a solution to the problem of a large axial space required for the spring. That patentee provided a shaft seal device, which included a cylindrical seal ring member made of elastomeric material disposed between a rotary ring, which was fluid-tightly fitted onto the rotating member, and a stationary ring, which was fluid-tightly fitted onto the stationary member. Both the end faces thereof came in contact with the corresponding faces of the stationary member and the rotating member. The seal ring member had at least two annular grooves formed on its outer surface, and ring-shaped resilient means were fitted into each such annular groove, so that both the end faces of the seal ring member were forcibly thrusted against the corresponding faces of the rotary ring and the stationary ring under the influence of the contractive force of the resilient means, thereby to ensure fluid-tightness therebetween. A progressive seal ring made of a fluororesin was fixedly-secured to the end face of the stationary ring.

This patent suffered numerous shortcomings, including the complexity of assembling the seal device upon installation or subsequent servicing. It was not designed to be splittable to be easily retrofitted to existing equipment, nor was it designed to be mounted externally (i.e., on the atmospheric side of the equipment casing) to facilitate installation or replacement of wearable components. In fact, it required a precisely dimensioned internal counterbore into which the stationary ring was pressed and retained, as well as a predetermined and fixed axial distance between the internal face of the equipment and the rotating member, between which the stationary assembly portion is disposed. By virtue of these shortcomings, it is apparent that a specific piece of equipment must be either originally designed to accommodate this shaft seal device, or be later modified, if possible, to accept it. It is also apparent that this device cannot be either installed, serviced or replaced upon failure or wearing-out, without removing from service and dismantling the equipment and reassembling, usually at considerable expense and effort.

Other patents have provided clamping members in the form of a circumferential band clamp. For example, in U.S. Pat. No. 3,689,084 patented Sep. 5, 1972 by R. W. Smedly, an auxiliary oil seal was provided, for installation upon a gear box and associated shaft which had developed a fluid leak through a previously installed oil seal. A flexible seal member was installed around the rotatable shaft adjacent to the stationary gear box wall. The seal member was then secured to the stationary wall using a settable plastic or other similar means. A circumferential clamp could be secured around the outside of the seal member, simply to retain it in its installed position, with its cut-ends abutting each other.

This patent suffered numerous shortcomings. In this design, there was no means of manually-adjusting the sealing-contact, and, as is the case with virtually all radial lip-seal type devices, it was relatively limited in its self-compensating (for relative shaft movement and wear) capabilities.

U.S. Pat. No. 4,296,935 patented Oct. 27, 1981 by Hitachi Ltd. provided an internal mechanical seal for a rotary shaft which included the provision of axial force from bias springs, disposed loosely in a well in a retainer to urge an axially movable ring towards a seal ring and thus to provide seal faces. In This structure, it was difficult to maintain the springs in the well for the purpose of assembly.

This patent suffered many other disadvantages. It was not designed to be splitable to be easily retrofitted to existing equipment, nor was it designed to be mounted externally (i.e., on the atmospheric side of the equipment casing) to facilitate installation or replacement of wearable components. In fact, it requires a precisely dimensioned internal counterbore as well as a predetermined axial distance between the internal face of the equipment and the rotating member, between which the stationary assembly portion was disposed. By virtue of these shortcomings, it is apparent that a specific piece of equipment must be either originally designed to accommodate this mechanical shaft seal or be later modified, if possible, to accept it. It is also apparent that this device cannot be either installed, serviced or replaced upon failure or wearing-out, without removing from service and dismantling the equipment and reassembling, usually at considerable expense and effort.

U.S. Pat. No. 4,576,384 patented Mar. 18, 1986 to A. W. Chesterton Co. provided a split mechanical face seal in which the rings were non-rigidly supported in an axial direction by resilient support means axially biasing the sealing surfaces of the rings together.

This structure had several drawbacks, not the least among them being that it was relatively complex and consequently difficult and time-consuming to install, and would prove relatively demanding with regards to manufacturing processes and consequently be quite expensive. Also, it was very limited in regards to its capabilities to perform satisfactorily under adverse mechanical conditions, e.g. as often was encountered with rotating equipment subject to excessive relative shaft movements (angular, axial and radial).

U.S. Pat. No. 3,988,026 patented Oct. 26, 1976 by O. E. Kemp Jr. provided what was purported to be a self-compensating rotary seal member. As described, such seal was not split and therefore was not easy to retrofit to existing equipment. To install such seal on existing equipment, the equipment would have to be disassembled. Such seal could compensate for some degree of radial movement (eccentricities) and angular tilting, but not for axial displacements. It was only capable of performing on low-pressure applications. The pressure of the media being contained acted to force the seal faces open, rather than serving to urge the seal faces into rotatable sealing contact.

In spite of these prior patents there is still a need for a simple, effective and economical seal which can be easily retro-fitted to existing equipment, and which will function even under extremely adverse mechanical conditions, as is often encountered with older, worn equipment and the like.

SUMMARY OF THE INVENTION (i) Aims of the Invention

Hence, it is an object of the present invention to provide an externally-mounted, stationary-design, self-aligning, rotary face-seal which ensures fluid-tightness for inhibiting flow from the inside of the equipment to the outside, and vice versa.

Another object of the present invention is to provide an externally-mounted, stationary-design, self-aligning rotary face-seal which either is self-adjustable or is manually-adjustable to ensure fluid-tightness of the seal.

Yet another object of this invention is to provide a seal which is easily and quickly retrofitable to existing equipment to enable to seal to be fitted with no need to modify or refurbish the equipment, and which would have some or all of the following advantages, namely: (i) it could be mounted externally to the equipment housing (stuffing-box) where it would be fully visible and accessible; (ii) all major components could be manufactured fully-split to enable initial installation (and possible subsequent parts replacement) to be done in situ with no need to disassemble the equipment; (iii) it would be very compact in its assembled operating-length; (iv) since no part of the seal would need to be fitted internally, it would not be restricted by axial or radial size limitations of existing stuffing-boxes; (v) it would be of a stationary design, which would be self-aligning for a considerable degree of lack of perpendicularity of the mounting-surface of the equipment housing, to the axis of rotation; and (vi) it would be designed with an absolute minimum number of components to be handled, namely, only three major components plus gasket/O-ring(s)/band clamp(s) with no fragile materials in delicate cross-sections, so that it could be installed and/or serviced by untrained personnel, with no need of special tools or laborious instruction.

Still another object of this invention is to provide such a seal which can handle extremely adverse mechanical conditions, and which would have some or all of the following advantages, namely: (i) it could be manually-adjustable or be self adjusting to compensate for relative axial displacement of the rotating shaft to the equipment housing, and/or to compensate for eventual face-wear, while the equipment is in service; (ii) unlike mechanical packings or lip seal devices, or prior art face-seal designs, especially internally-mounted types and rotating design, as opposed to stationary-design types, such a seal would be self-compensating for a large degree of relative radial displacements and angular misalignments, all of which conditions often being caused by bearing-failures or bent shafts or extreme equipment wear caused by excessive side-loading or misalignment or shaft-driving element, or inferior or inadequate-for-the-service equipment design; (iii) such a seal would not be adversely affected by extreme shaft/shaft sleeve or equipment-housing wear or corrosion, such conditions frequently accelerating the premature failure of prior art sealing-device types; and (iv) such seal, being of robust design and being made of robust materials of construction could survive considerably more mechanical abuse, e.g., excessive and frequent relative shaft movement, mechanical shocks, erosive wear from media it is exposed to, than prior art sealing-device designs without parts fracturing, drive-pins shearing, springs fatiguing, mating-faces and/or exposed parts being eroded.

A further object of this invention is to provide such a seal which is economical and is of optimum cost effectiveness, and which would have one or more of the following advantages, namely: (i) it could permit the manufacture of a small number of components, by very conventional and inexpensive machining and molding practices, from relatively inexpensive and readily available materials; (ii) it could permit the selection of materials of construction for all components, to facilitate the application of the most cost-effective combinations of components, for a given application having regard to operating parameters, pressures, velocities, temperatures, media to be sealed, and mechanical conditions; (iii) it could minimize or obviate equipment wear by providing no seal component in dynamic-sealing contact with shaft/shaft sleeve or with the equipment housing; (iv) it could provide optimum leakage-control, compared to prior art sealing devices, thereby reducing or eliminating product-loss and environment-pollutions and consequently to avoid subsequent treatment or clean-up costs; (v) it could provide savings in labor and costs of replacement parts ease and speed of installation and relative immunity to existing equipment wear/damage, e.g. of the shafts and sleeves, and also to provide savings with regards to production losses i.e. overtime payments; and (vi) it could provide simplicity and ease-of-installation and manufacture from robust component materials and designs, so as to be less susceptible to accidental damage upon installation, or to installation errors, e.g., inaccurate measuring and their accompanying costs, e.g. by requiring no measuring.

(ii) Statement of Invention

Therefore, by this invention, an externally-mounted, stationary-design, self-aligning, rotary face-seal is provided for securement to a rotatable member.

The seal comprises: (i) a mounting plate adapted to be secured to the equipment with the rotatable shaft member extending therethrough; (ii) a stader springingly secured to the mounting plate; (iii) a rotor, fluid-tightly fitted and secured onto the rotatable shaft member, downstream of the stator, an upstream face of the stator being in sealing contact with a downstream face of the stator; (iv) a resilient operator disposed between the mounting plate and the stator for urging the downstream face of the stator into sealing contact with the upstream face of the rotor; and means operable to translate an axially-directed force from the resilient operator to an upstream face of the stator. In this way, the downstream face of the stator is pressed into tight sealing contact with the adjacent upstream face of the rotor.

(iii) Other Features of the Invention

In one feature of this invention, namely in one embodiment of this invention, the mounting plate includes a hollow stub protuberance projecting therefrom, and the resilient operator comprises a resilient cylindrical elastomer energizer mounted around the hollow stub protuberance and an externally- and manually-adjustable clamp member of the circumferentially-clamping type fitted to the circumference of the resilient cylindrical elastomer energizer member, and manually operable to elongate the resilient cylindrical elastomer energizer member in the axial direction under the influence of contractive force caused by means of the clamp member. In this way, a downstream end face of the resilient cylindrical elastomer energizer member is placed in tight contact against the adjacent upstream end face of the stator, and a downstream end face of the stator is placed in tight contact against the adjacent upstream end face of the rotor.

The resilient cylindrical elastomer energizer is preferably made of a low durometer, highly resilient, elastomeric material. Tightening of the circumferential clamp urges the faces of the elastomer energizer outwardly in an axial direction, thereby pressing the stator into tight sealing contact with the rotor.

In another feature of the invention, namely in another embodiment of this invention, the mounting plate includes a hollow stub protuberance projecting therefrom, and the resilient operator comprises a plurality of springs captured on anti-rotation pins on the inboard end face of the stator, and secured within wells on the adjacent end face of the mounting plate, or vice versa. The springs are preloaded and thus tend to press the stator axially into tight sealing contact with the rotor.

In other features of the invention, namely in each of the two embodiments of the invention, the major components may be split for retrofitting to existing equipment. The stator, rotor, and mounting plate halves may be aligned and held together by dowel pins and a circumferential clamp. Alternatively, they may be aligned and held together by tangentially-oriented bolts and nuts.

In yet another feature of the invention, namely in the first embodiment of the invention as described above, the resilient cylindrical elastomer energizer is diametrically split, and is held together and adjusted by means of a circumferential clamp.

In still another feature of the invention, namely in the second embodiment of the invention, as described above, the stator may be split and may be of the structure described above. The springs may be preloaded by having the anti-rotation pins threaded into tapped apertures in the end face of the stator, with springs and washers contained thereon. Preferably, an O-ring is disposed between the outer circumferential surface of the hollow stub protrusion and the inner circumferential surface of the stator, to provide a tight seal, while permitting relative axial movement between the two.

In still another feature of the invention, namely in each of the embodiments of the invention as described above, it is preferred that the stator also include an annular recess therein whereby the tight sealing contact is also enhanced by the fluid under pressure in the equipment.

In a still further feature of the invention, namely in each of the embodiments of the invention as described above, the rotor may be firmly secured to the rotatable member by means of at least one set screw. Preferably an O-ring is disposed between the rotor and the rotatable member to provide a tight seal.

In another feature of the invention, namely in each of the embodiments of the invention as described above, the mounting plate may also include a purge or flush port. The mounting plate may also be fitted with a restrictor lip/shut-down seal formed of elastomeric material, in sealing engagement with the rotatable shaft.

BRIEF DESCRIPTION OF THE DRAWINGS

In the accompanying drawings.

Figure 1:
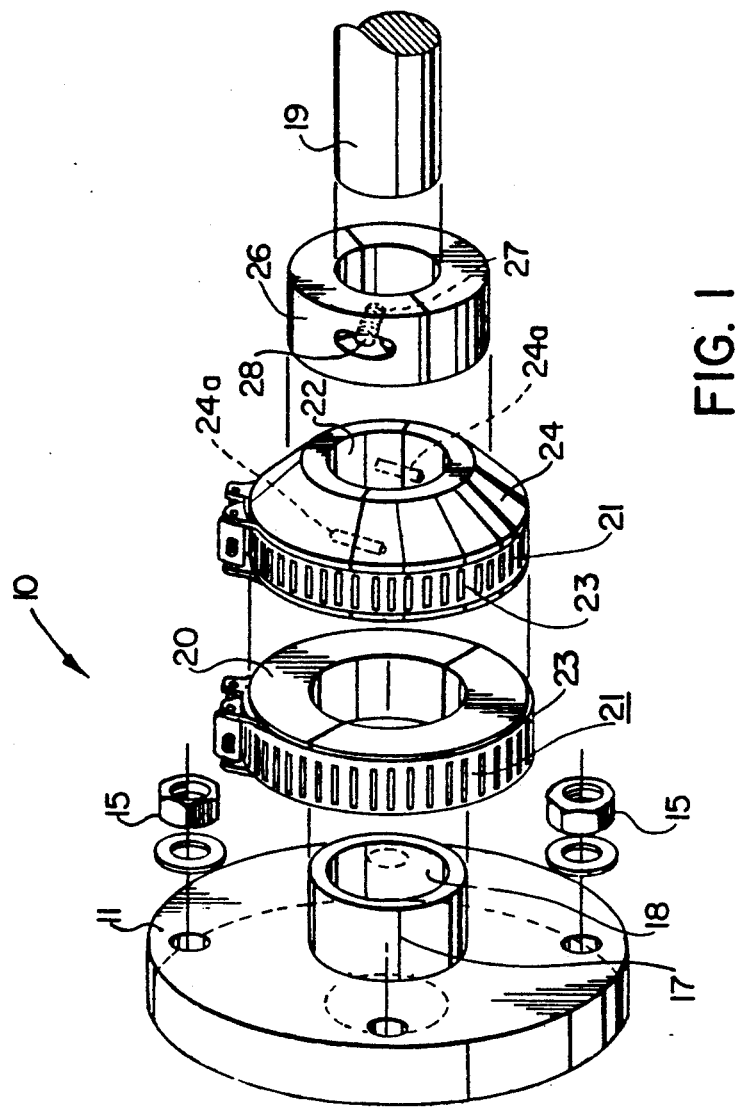
FIG. 1 is an exploded perspective view of one embodiment of the externally-mounted, stationary-design, self-aligning rotary face-seal of this invention.
Figure 1:
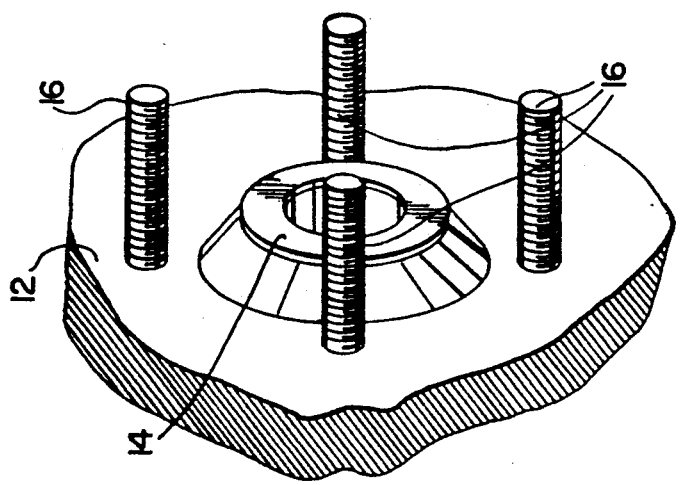
Figure 2:
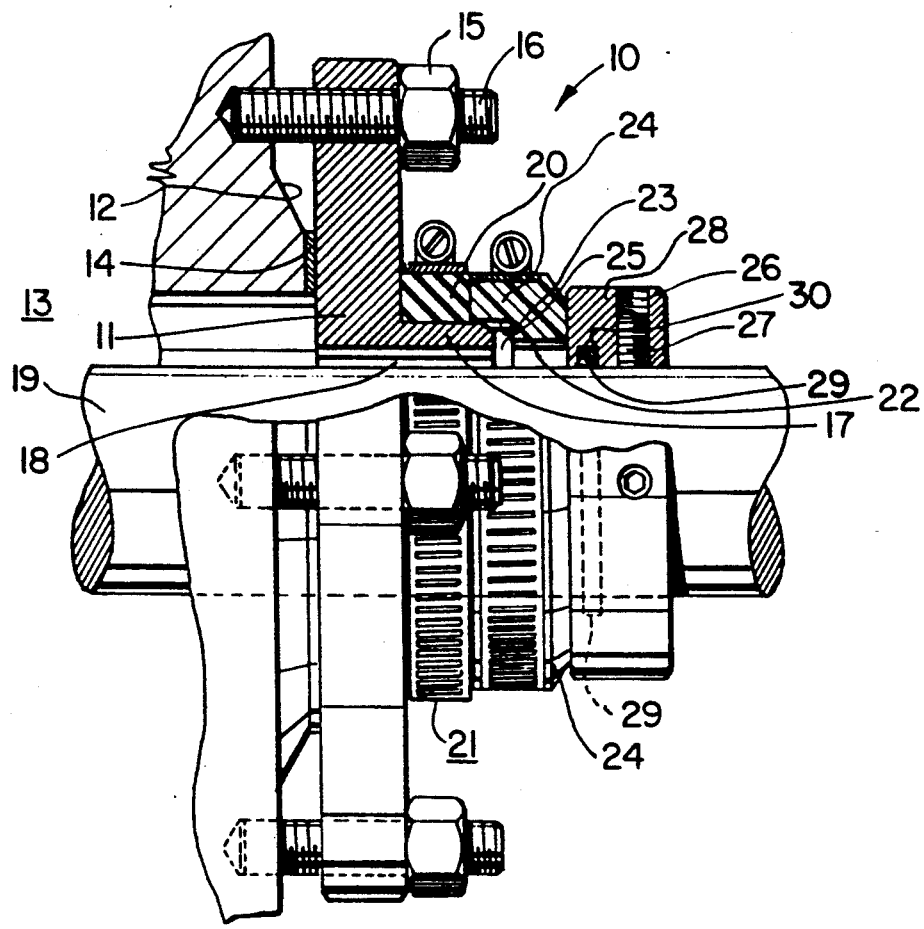
FIG. 2 is a central longitudinal cross-section of the embodiment shown in FIG. 1.

DESCRIPTION OF PREFERRED EMBODIMENTS (i) Description of FIGS. 1 and 2

As seen in FIGS. 1 and 2, the seal 10 includes a mounting plate 11 secured to the outer face 12 of the housing of equipment 13, by means of a plurality of nut/bolt members 15, 16. A gasket 14 is interposed between the mounting plate 11 and the outer face 12 of the housing of the equipment 13. The mounting plate 11 includes an outer stub protuberance 17 surrounding a shaft opening 18, through which a rotatable shaft 19 protrudes. A fluid, gas or granular solid medium under pressure is usually contained within the equipment 13.

Disposed on the protuberance 17 is a resilient, cylindrical, elastomer energizer 20, which is split for installation around the shaft and protuberance 17. The resilient, cylindrical elastomer energizer 20 is held together and is adjusted for axial-loading of the stator upon installation by means of a band-clamp member 21 of the circumferentially-clamping type.

A stator 24, generally of frusto-conical shape and diametrically split, is also disposed partially around the protuberance 17 in face-to-face contact with the outer face of the resilient, cylindrical elastomer energizer 20. In this embodiment, the two halves of the split stator 24 are aligned radially and axially by a pair of dowel pins 24a, and are held together by means of another band-clamp member 21 of the circumferentially-clamping type. The stator 24 includes an internal annular recess 25 created by virtue of the fact that the inside diameter of stator 24 at 22 is less than its inside diameter at 23.

A rotor 26, which is also diametrically split, is firmly secured to the rotatable shaft 19 by means of a plurality of set screws 27 within associated tapped holes 28 in the rotor 26. A recess 30 within the rotor 26 accommodates an O-ring 29 which is spliced around the shaft upon installation and is in static contact with the rotatable shaft 19, to provide a tight seal therebetween.

The resilient, cylindrical, elastomer energizer 20 preloads the stator 24 axially, and performs as a secondary-seal component in that in essence it provides a gasket seal between stator 24 and protuberance 17 of mounting plate 11. Because it is made of an elastomeric material having a high coefficient of friction, it also serves as an anti-torque device of the stator 24. Alternatively, stator 24 may be bonded to resilient, cylindrical, elastomer energizer 20. In operation, tightening of the circumferential band-clamp around resilient, cylindrical, elastomer energizer 20 provides an axial force against stator 24 urging it into rotatable sealing contact with rotor 26. A second axial force is also effected by means of the contained gas or fluid under pressure in the equipment acting within annular recess 25.

Figure 3:
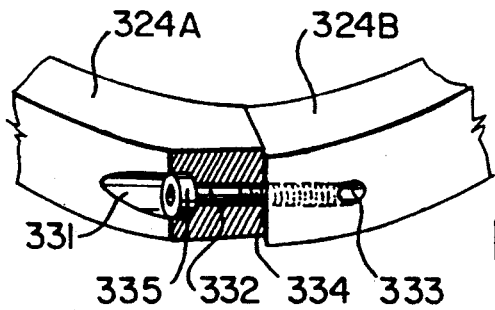
FIG. 3 is partial sectional view of one form of split member.

(ii) Description of FIG. 3

Another embodiment of the invention, providing an alternative split component construction for any of the three major components, i.e., the mounting-plate 11, the stator 24 or the rotor 26, is shown in FIG. 3. Any or all of these components may be split in halves, namely 324A and 324B. These are provided with a pair of cooperative connecting units, only one of which is shown. Each connecting unit includes a recess 331 in segment 324A through which is passed a bolt 334. A threaded bore 333 is provided in segment 324B, into which bolt 334 is threaded to hold split segments 324A and 324B together.

Figure 4:
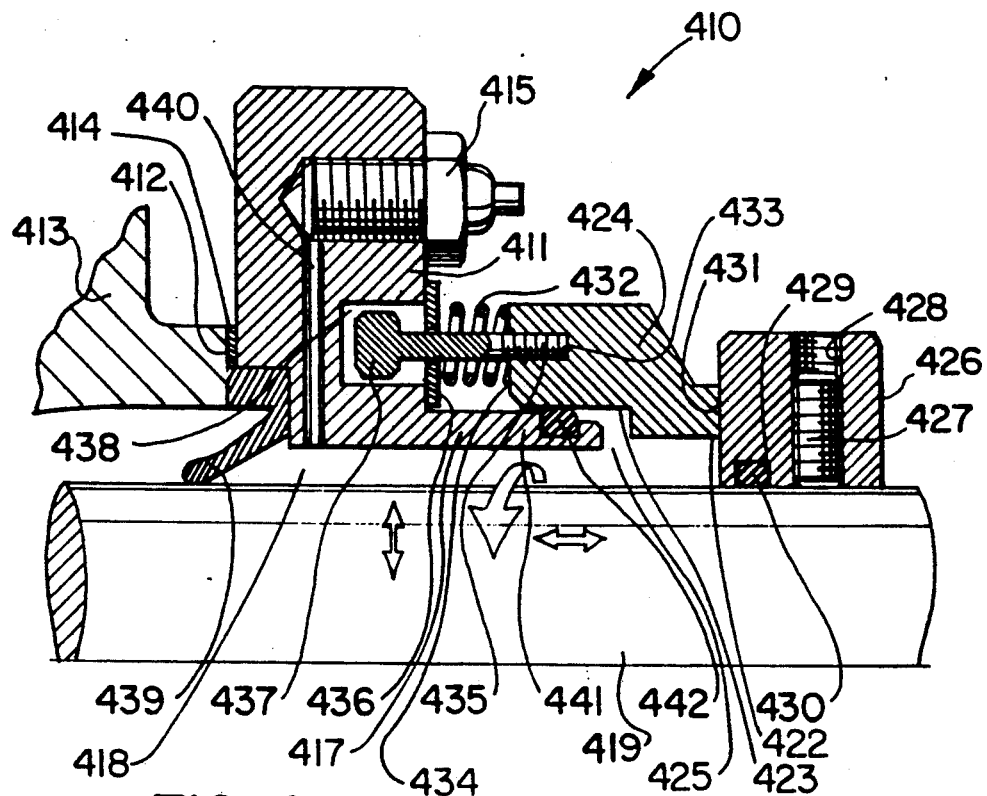
FIG. 4 is a central longitudinal cross-section of the externally mounted, stationary-design, self-aligning, rotary face-seal of another embodiment of this invention.
Figure 5:
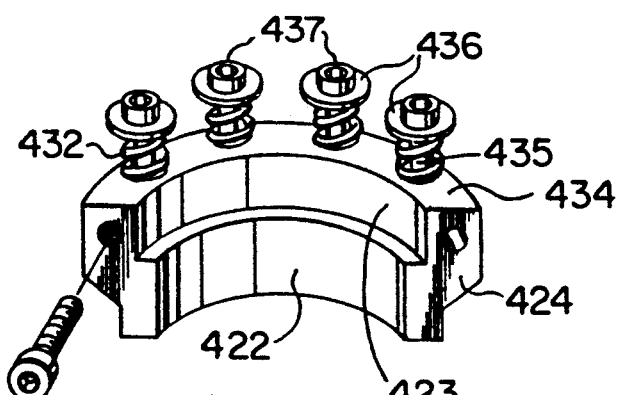
FIG. 5 is a perspective view of one half of the split stator complete with the resilient operator of the embodiment shown in FIG. 4.

(iii) Description of FIGS. 4 and 5

In another embodiment of the invention as seen in FIGS. 4 and 5, the seal 410 includes a mounting plate 411 secured to the outer face 412 of the housing of equipment 413, by means of a plurality of nut/bolt members (not seen, but similar to those shown in FIG. 1 as 15, 16). A gasket 414 is interposed between the mounting plate 411 and the outer face 412 of the housing of the equipment 413. The mounting plate 411 includes an outer stub protuberance 417 surrounding a shaft opening 418, through which a rotatable shaft 419 protrudes. A fluid or gas medium under pressure is usually contained within the equipment 413. Fluid-tightly secured to shaft 419 is a rotor 426 which is secured to shaft 419 by means of a plurality of set screws 427 in tapped holes 428. A sealing O-ring 430 is secured in recess 429 in rotor 426 having been spliced around shaft 419 upon installation to provide a tight seal against the shaft 419.

A stator 424 is axially-urged against rotor 426 to provide a primary sealing interface 431. The axial urging is provided by a plurality of precompressed coil springs 432 each secured on an associated one of threaded anti-rotation axial guide-pins 435, each installed in tapped holes 433 in the inboard face 434 of stator 424.

The ends of anti-rotation, axial guide-pins 435 are each provided with washers 436 and heads 437. As can be seen in these Figures, in this manner, the springs 432 are permanently retained on the assembly, instead of being potentially troublesome and loose components as with other prior art seals. The heads 437 of pins 435 are disposed within recesses 438 in mounting plate 411, thereby preventing rotation of stator 424.

As previously described, mounting plate 411 is bolted into tight sealing contact with outer face 412 of equipment 413 (bolts not shown), with gasket 414 interposed between. Mounting plate 411 is fitted with a restricting-lip/shut-down seal 439 formed of elastomeric material, in sealing engagement with the shaft 419. Mounting plate 411 is also provided with a purge or flush port 440. In some instances, e.g. when the product to be contained is very abrasive for example, it may be desirable to inject a clean liquid flush or purge with a compressed inert gas or with grease in order to restrict the ingress of product into the shaft opening 418. Mounting plate 411 is also provided with an axially-extending hollow stub protuberance 417 which is sealingly engaged with stator 424 by means of O-ring 442. O-ring 422 can be spliced around protuberance 417 upon installation.

All components can be manufactured in split form for installation and servicing. The split stator is forced against the rotor both by axial pressure of the preloaded coil springs and by the contained pressure of the medium in internal recess 425 which is created by virtue of the fact that the inside diameter of stator 424 at 422 is less than its inside diameter of 423.

CONCLUSION

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

What I claim is:

1. An externally-mounted, stationary-design, self-aligning, rotary face-seal for securement to a rotatable shaft member extending through a housing of equipment containing a media which is to be sealed therein, said seal, when secured to said rotatable shaft member, comprising:

(i) a mounting plate having an inboard face and an outboard face, said mounting plate having a plurality of spaced-apart recesses in the outboard face thereof, said mounting plate being secured with its inboard face abutting said housing of said equipment in sealed relation therewith and with said rotatable shaft member extending through the mounting plate and projecting exteriorly of said housing into an ambient environment;

(ii) a diametrically-split stator having an inboard face and an outboard face, said stator being disposed in said ambient environment and being fitted with a plurality of spaced-apart anti-rotation guide pins projecting from said inboard face of said stator, the projecting ends of said guide pins being disposed within associated recesses in the outboard face of said mounting plate, and a resilient spring member captured on each associated guide pin, one end of said spring member abutting said inboard face of said stator, each said spring member being retained on said associated pin and being presented from entering said recess, thereby providing a preassembled unit comprising said stator, said guide pins and said resilient spring members; and (iii) a diametrically-split rotor having an inboard face and an outboard face, fluid-tightly fitted and secured onto said exteriorly projecting rotatable shaft member, said rotor being disposed in said ambient environment, and said inboard face being in sealing contact with said outboard face of said stator;

each said resilient spring member which is captured on each associated said guide pin thereby being disposed between said outboard face of said mounting plate and said inboard face of said stator, said resilient spring members thereby urging said outboard face of said stator axially into tight sealing contact with said inboard face of said rotor both when said rotatable shaft is not rotating and during rotation of said rotatable shaft.

2. The externally-mounted, stationary-design, self-aligning rotary face-seal of claim 1 wherein each said guide pin includes an enlarged head disposed in said recess in said outboard face of said mounting plate and a washer of larger diameter than the diameter of said recess disposed between said resilient spring member and said enlarged head, thereby to prevent said spring from entering said recess, said enlarged head being adapted to retain said washer and said spring member.

3. The externally-mounted, stationary-design, self-aligning rotary face-seal of claim 1 wherein said mounting plate includes a stub protuberance projecting into said ambient environment from said outboard face of said mounting plate; and further including an O-ring seal between opposed circumferential surfaces of said stub protuberance and said stator.

4. The externally-mounted, stationary-design, self-aligning rotary face-seal of claim 3 including a port within said mounting plate for injection of a fluid under pressure therethrough into the annular region between said shaft and said mounting plate and stator, whereby said tight contact is also enhanced by the fluid being contained under pressure in said equipment.

5. The externally-mounted, stationed-design, self-aligning rotary face-seal of claim 1 including a flexible lip element of elastomeric material secured to said face plate and being disposed in circumferential sliding engagement with said rotating shaft.

6. The externally-mounted, stationary-design, self-aligning rotary face-seal of claim 1 wherein said rotor is secured to said shaft by means of at least one set screw; and further including an O-ring seal between opposed circumferential surfaces of said rotor and said shaft.

7. The externally-mounted, stationary-design, self-aligning rotary face-seal of claim 1 wherein said mounting plate, said stator and said rotor are diametrically split into two halves to provide opposed flat faces, said halves each being held together by bolts disposed tangentially from one half to an internal nut or a threaded hole in the other half.

8. The assembly of claim 1, wherein the mounting plate is diametrically split.

* * * * *